Patented Aug. 3, 1954

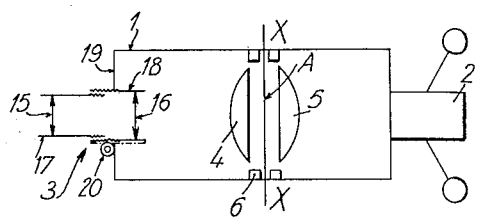
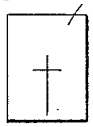
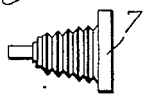
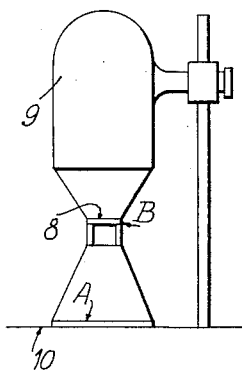
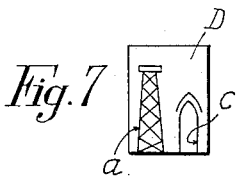
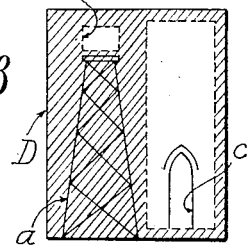
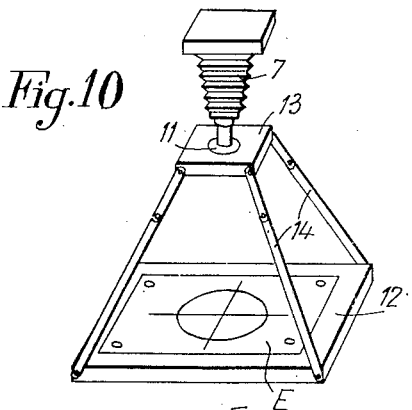
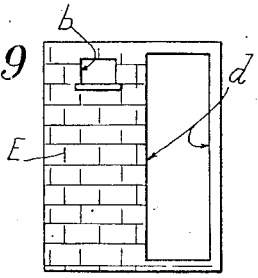
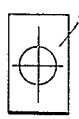

2,685,223

UNITED STATES PATENT OFFICE 2,685,223

METHOD FOR PREPARING CUTOUT MASKS FOR USE IN TAKING COMPOSITE MOTION PICTURES

Achille Pierre Dufour, Paris, France, assignor, by mesne assignments, to Vistascope, Inc., Los Angeles, Calif., a corporation of California Application November 6, 1950, Serial No. 194,249

Claims priority, application France December 13, 1949

1 Claim. (Cl. 88—16)

This invention relates to improvements in the methods for preparing cut out masks for use in taking composite motion pictures, by the process in which the objective of an auxiliary optical device forms a real image of the actors and of the background in the plane of a flat cut-out mask defining a foreground configuration, the combination of said mask and said real image constituting the object with respect to the lens of the camera, as described in applicant's Patent No. 2,488,177, issued November 16, 1949. For the sake of clearness, said optical device will be hereinafter called by its commercial name, the "Simplifilm."

In carrying out said method, the mask consists of a drawing or a photographic picture on an opaque support, suitably cut out to leave transparent portions through which a portion of the image of the actors and background is visible from the camera. In most cases, this mask is not integral but is made up of photographic and/or graphic elements assembled together by means of an adhesive so as to produce the more or less fanciful scenery conceived by the decorator. This assembling is carried out in the workroom of the decorator, who has frequently to adjust or touch up the mask in the studio or on the site where the pictures are to be recorded, either because the mask improperly conceals a portion of the background which should be visible in the film, or conversely because it reveals a detail of the studio equipment or a part of the background which should not appear in the film, or because the whole combines or harmonizes badly.

This adjustment in the studio or on the site represents a loss of time and money, which may sometimes be considerable, and it is an object of the invention to provide a method which enables the decorator to prepare the assembly in his workroom under conditions such that the mask thus produced does not require any subsequent improvement or adjustment, this method making use of a very simple auxiliary material.

With this object in view, the invention consists in the combination of the following operations:

1. By means of a portable photographic camera the studio, landscape or site where the actors will play or which will supply the background and the image of which is to be partly concealed by the mask, is photographed from the exact viewpoint from which the scene is to be filmed for the purpose of obtaining a reduced scale image, hereinafter called a "reference record."

2. The reference record on reduced scale is then placed in the slide of a photographic enlarger, the degree of enlargement of which is so adjusted that the enlarged image of the reference record (hereinafter called "reference enlargement") can register with the image of the same object as would be obtained by means of the objective of the "Simplifilm" apparatus, in the plane of the mask.

3. The mask is cut out or made up of assembled elements over said "reference enlargement."

It will be readily understood that since the decorator has now at his disposal, for devising the mask, an enlargement of the reference record on the same scale as the mask and displaying the details of the studio or the site, he can readily delineate, compose or assemble the mask and effect on the paper the necessary adjustments so as to build up a harmonious assembly, in the best conditions of easiness, rapidity, convenience, economy and efficiency.

For an easy adjustment of the enlarger, several ways are possible:

According to a first embodiment of the method according to the invention, the procedure is as follows:

(a) With the aid of the portable photographic camera above referred to, a photograph is taken of any suitable object. This photograph, printed on a transparent support, will be hereinafter called a "comparison record."

(b) The "comparison record" is introduced into the slide of the enlarger so as to obtain, for example on paper, an enlargement, hereinafter called "gauge enlargement," the degree of enlargement being such that the "gauge enlargement" can register with the image of the same object, as obtained through the auxiliary lens of the Simplifilm apparatus in the plane of the mask. The enlarger is then locked in this position of adjustment.

As a modification, these two operations may be replaced by the following ones:

($a^1$) A photo-sensitive element (for example, a photographic plate or sensitized paper) is arranged in the mask holder or slide of the Simplifilm apparatus and any suitable object is photographed on said photosensitive element through the auxiliary lens of the Simplifilm apparatus. The record obtained will be hereinafter called "gauge record."

($a^2$) For the "Simplifilm" apparatus is substituted the portable photographic camera above referred to and a photograph is taken of the object referred to under $a^1$, from exactly the same view point, for the purpose of obtaining a "comparison record" providing an image identical with the "gauge record" except for the size.

($a^3$) The "comparison record" is introduced into the slide of the enlarger, the "gauge record" is placed on the table thereof, and the enlarger is so adjusted that the enlarged image of the "comparison record" registers with the "gauge record," whereupon the enlarger is locked in this position of adjustment.

Finally, a third solution consists in using an optical accessory, comprising a converging optical system, the focal length of which is equal to that of the auxiliary lens of the Simplifilm apparatus, disposed above a table situated in the focal plane of said converging optical system, in photographing with the aid of the portable photographic camera above referred to, through said optical system, any suitable "gauge drawing" disposed on the table, introducing the "gauge record" thus obtained into the slide of the enlarger and disposing the "gauge drawing" on the table of the enlarger, adjusting the degree of enlargement of the enlarger so that the projection of the "gauge-record" on the table registers with the "gauge drawing," and locking the enlarger in this position of adjustment.

It may occur that the auxiliary lens of the Simplifilm apparatus will not be focused for infinity (when the back-ground is at a finite distance). In this case, the distance from the accessory optical system to the table thereof no longer corresponds to the "focal length" of the auxiliary lens of the Simplifilm apparatus and the enlargements of the two apparatus will not be strictly equal. This can be remedied by supplying the Simplifilm apparatus with an objective of adjustable focal length, i. e. by forming the same of lens components, the spacing of which can be so adjusted as to obtain a constant enlargement, even if the object, the image of which is to be produced in the plane of the mask, is not strictly at an infinite distance.

In the accompanying drawing, which diagrammatically illustrates different steps in carrying out the method according to the invention:

Fig. 1 is a diagram of the "Simplifilm" apparatus.

Fig. 2 shows the hand camera for making the "comparison record."

Fig. 3 shows the "comparison record."

Fig. 4 illustrates the adjustment of the enlarger.

Fig. 5 shows the "gauge enlargement."

Fig. 6 shows the "reference record" on reduced scale.

Fig. 7 shows the "reference enlargement."

Fig. 8 shows to enlarged scale the "reference enlargement" and the parts of the background to be concealed by the mask.

Fig. 9 shows the mask placed on the "reference enlargement."

Fig. 10 illustrates the accessory optical device adapted for adjusting the enlarger, in the position of use, and Fig. 11 shows the "gauge record" obtained with the device of Fig. 10.

Referring to the drawing, 1 is the "Simplifilm" apparatus, consisting of a box having at the rear an aperture adapted to register with the objective of the camera 2, and at the front an objective 3 coaxial with the optical axis of the camera and adapted to form in the plane X—X of a flat cut-out mask, located between field condensers 4 and 5, a real image of the background and the actors, the combination of the mask and said real image representing the composite scene of which a motion picture record is to be made by the camera 2.

According to a first embodiment of the method according to the invention, any suitable object is photographed by means of a photographic camera 7 (Fig. 2) for the purpose of obtaining a "comparison record" B (Fig. 3).

This "comparison record" B is introduced into the slide 8 of an enlarger 9 (Fig. 4) and a "gauge enlargement" A is printed on a photosensitive element placed on the table 10 of said enlarger, the latter being so adjusted that the "gauge enlargement" will coincide with the image of the same object as obtained through the objective 3 of the Simplifilm apparatus, in the plane of the mask, i. e., in the plane X—X of the Simplifilm apparatus shown in Fig. 1. The enlarger is then locked in this adjusted position.

This preparatory operation once carried out, the studio or open air site where the film is to be taken, and the image of which is to be partly concealed by the mask, is photographed by means of camera 7, from exactly the view point from which the scene is to be filmed, so as to obtain a "reference record" C on reduced scale (Fig. 6). By means of the enlarger 9, adjusted in the manner above explained, said "reference record" is enlarged, thus giving a "reference enlargement" D (Fig. 7), which serves as a guide for making the mask, on a scale equal to that of said mask.

Fig. 8 shows on enlarged scale the composite scene to be filmed, comprising portions of the background appearing in Fig. 7 and, cross-hatched, the zones which are to be concealed by the mask. It will be appreciated that it is very easy to delineate, adjust, compose or assemble said mask E (Fig. 9) with the aid of pieces of drawings or photographs in black or in colours, suitably cut out.

Supposing that a structure or scaffolding $a$ has been erected in the studio, to enable an actor to appear through a window $b$ of a foreground edifice represented by the mask E, this structure should be completely invisible, and it is easy to fulfil this condition in the workroom where the masks are prepared, without requiring subsequent corrections of the mask. Similarly, if a door $c$ existing in the rear wall of the studio is to appear in the film, the mask E will be provided with an opening $d$, of such size and location that the door $c$ shall not be concealed. The same "reference enlargement" will be very useful for combining two parts of a scenery, one being figurated on the mask and the other belonging to real structures existing in the studio.

According to a modification, a photo-sensitive element A, for example a sheet of sensitized paper, is first placed in the mask holder 6 of the Simplifilm apparatus 1 and a photograph is made of any suitable object through the Simplifilm objective 3, for the purpose of obtaining a "gauge record" similar to the "gauge enlargement" represented in Fig. 5.

A portable photographic camera 7 (Fig. 2) is then substituted for the "Simplifilm" apparatus and the same object is photographed as before exactly from the same viewpoint, in order to obtain a "comparison record" B (Fig. 3) exhibiting an image which is identical with the "gauge record" of Fig. 5, except for the size.

"Comparison record" B is then inserted into the slide $b$ of the enlarger 9 (Fig. 4), "gauge record" A is placed on the table 10 of the enlarger and the latter is so adjusted that the enlarged image of the "comparison record" B coincides with "gauge record" A, whereupon the enlarger is locked in this position of adjustment. The further operations are the same as in the preceding case.

According to a further modification of applicant's method, use is made of an accessory device shown in Fig. 10, which comprises a converging optical system 11, the focal length of which is equal to that of the objective 3 of the Simplifilm apparatus, and which is disposed above a table 12, situated in the focal plane of said converging optical system 11. To this end, the optical system 11 is carried by a mounting 13, connected to table 12 by preferably folding arms 14.

To adjust the enlarger, a photograph is made with the aid of the portable camera 7, through the optical system 11, of any suitable "gauge drawing" F disposed on table 12. The optical system 11 acts with respect to the objective of camera 7 as a correcting lens transferring to infinity the object to be photographed (drawing E). In focusing the apparatus 7 at infinity, there is thus obtained a "gauge record" G (Fig. 11), which is introduced into the slide 8 of the enlarger 9 (Fig. 4), whilst the drawing F is placed on the table 10 of the enlarger; the degree of enlargement of the enlarger is so adjusted that the projection of the gauge record G on to the table 10 registers with the gauge drawing F, and the enlarger is locked in this position of adjustment. The following sequence of operations is similar to that described with reference to Figs. 6 to 9.

If the background, the image of which is formed in the plane X—X of the Simplifilm apparatus and is represented in Fig. 7, is not at an infinte distance, the objective 3 of the Simplifilm must be moved away from plane X—X to effect the proper focusing in order to obtain a sharp image in this plane. This displacement of the objective 3 alters the coefficient of enlargement of the image (the real image obtained will be larger than that represented in Fig. 7). However, the spacing between the optical system 11 and the table 12 of the optical mounting of Fig. 10 is constant, whereby the enlargement thereof is constant, and the exact adjustment of the enlarger 9 (obtained with the aid of the "gauge record" G and "gauge drawing" F) and the ratio of enlargement between "reference record" C and "reference enlargement" D will be destroyed. This can be remedied by providing the Simplifilm apparatus with an objective 3 having an adjustable focal length, as illustrated in Fig. 1.

For example, this objective may consist of two simple or composite lenses 15 and 16, mounted respectively in two barrels 17 and 18, one of which is movable axially in relation to the other (for example, one is screwed into the other), the assembly being adjustably mounted in the front wall 19 of the Simplifilm apparatus. Focusing is effected, for example, by the aid of a milled knob 20, controlling a pinion meshing with a rack rigid with the lens holder.

When the background is at a finite but comparatively far distance, as is usually the case, it is possible, instead of varying the distance of the whole objective 3 relatively to plane X—X with the aid of knob 20, to leave this distance constant and to obtain a sharp image in the plane X—X by slightly modifying the focal length of this objective by varying the spacing of the component lenses 15 and 16 and completing the adjustment, if necessary, by actuation of the knob 20, in such a way that the enlargement of the apparatus thus adjusted will be identical with the enlargement corresponding to focusing at infinity.

It will be seen that the use of the auxiliary camera 7, the enlarger 9 and possibly the optical mounting shown in Fig. 10 does away with the necessity of using, for the preparation of the mask, the Simplifilm apparatus 1, which is comparatively heavy and cumbersome and which may not be available at the time required.

Having now described my invention what I claim as new and desire to secure by Letters Patent is:

In a process for preparing cut-out masks for use in taking composite motion pictures by forming, through the objective of an auxiliary optical device associated with a motion picture camera, a real image of actors and of a background in the plane of a cut-out mask defining a foreground configuration, said mask and said real image constituting the object with respect to the objective of said motion picture camera, the steps which comprise: photographing with an auxiliary photographic camera said background from the same viewpoint as said motion picture camera to obtain a small scale reference record; photographing with said auxiliary photographic camera an object to obtain a comparison record on a transparent support; obtaining through said auxiliary optical device and in said plane of the cut-out mask a photograph of said object; placing said photograph on the table of a photographic enlarger; placing said transparent comparison record in the slide of said enlarger; adjusting the coefficient of enlargement of said enlarger by focusing the latter to obtain on the table thereof from said transparent comparison record a gauge enlargement image coinciding accurately with said photograph; locking said enlarger for said adjusted coefficient of enlargement; replacing said comparison record by said small scale reference record in the slide of said locked enlarger to produce from said small scale reference record in said locked enlarger a photographic reference enlargement of said background; whereby the dimensions of the image of said background on said reference enlargement coincide with the dimensions of the real image of said background formed from said viewpoint through said auxiliary optical device in the said plane of the cut-out mask; and cutting a mask to conceal and reveal respective portions of said background produced on said reference enlargement of said background.

References Cited in the file of this patent

UNITED STATES PATENTS

| Number | Name | Date |
| --- | --- | --- |
| 1,540,213 | Hammeras | June 2, 1925 |
| 1,616,237 | Seitz | Feb. 1, 1927 |
| 1,669,407 | Artigue | May 15, 1928 |
| 1,673,019 | Pomeroy | June 12, 1928 |
| 1,679,942 | Newton | Aug. 7, 1928 |
| 1,727,288 | Johnson | Sept. 3, 1929 |
| 1,955,993 | Williams | Apr. 24, 1934 |
| 2,024,081 | Williams | Dec. 10, 1935 |
| 2,120,586 | Whitman | June 14, 1938 |
| 2,488,177 | Dufour | Nov. 15, 1949 |

FOREIGN PATENTS

| Number | Country | Date |
| --- | --- | --- |
| 593,045 | Great Britain | Oct. 7, 1947 |